(12) United States Patent
Bailly et al.

(10) Patent No.: US 8,126,597 B2
(45) Date of Patent: Feb. 28, 2012

(54) FORMULATION OF A PREVENTIVE MAINTENANCE MESSAGE RELATING TO THE FUNCTIONAL DEGRADATIONS OF AN AIRCRAFT

(75) Inventors: Carine Bailly, Tournefeuille (FR); Christian Sannino, Muret (FR); François Fournier, Roques sur Garonne (FR)

(73) Assignee: Thales (FR)

( * ) Notice: Subject to any disclaimer, the term of this patent is extended or adjusted under 35 U.S.C. 154(b) by 1116 days.

(21) Appl. No.: 11/952,478

(22) Filed: Dec. 7, 2007

(65) Prior Publication Data

US 2008/0215194 A1 Sep. 4, 2008

(30) Foreign Application Priority Data

Dec. 8, 2006 (FR) .................................. 06 10732

(51) Int. Cl.
*G06F 17/00* (2006.01)
(52) U.S. Cl. ...................... 701/3; 702/184; 701/29
(58) Field of Classification Search .............. 701/29, 701/3; 702/36, 184; 340/500
See application file for complete search history.

(56) References Cited

U.S. PATENT DOCUMENTS

| | | | | |
|---|---|---|---|---|
| 4,414,539 A * | 11/1983 | Armer | ............................ | 340/500 |
| 4,480,480 A * | 11/1984 | Scott et al. | ....................... | 73/769 |
| 4,649,515 A * | 3/1987 | Thompson et al. | ............. | 706/52 |
| 5,099,436 A * | 3/1992 | McCown et al. | ................ | 702/82 |
| 5,210,704 A | 5/1993 | Husseiny | | |
| 5,552,984 A * | 9/1996 | Crandall et al. | ................. | 701/31 |
| 6,085,154 A * | 7/2000 | Leuthausser et al. | ............ | 702/34 |
| 6,845,306 B2 * | 1/2005 | Henry et al. | ..................... | 701/29 |
| 7,502,744 B2 * | 3/2009 | Garrow et al. | .................. | 705/1.1 |
| 7,702,435 B2 * | 4/2010 | Pereira et al. | .................... | 701/29 |
| 2003/0187554 A1 * | 10/2003 | Henry et al. | ..................... | 701/29 |
| 2005/0096873 A1 * | 5/2005 | Klein | ............................. | 702/184 |
| 2006/0056952 A1 * | 3/2006 | Haris | .......................... | 414/744.6 |
| 2006/0056959 A1 * | 3/2006 | Sabol et al. | ..................... | 415/118 |
| 2006/0069520 A1 * | 3/2006 | Gorinevsky et al. | ............ | 702/36 |
| 2006/0097854 A1 * | 5/2006 | Basu et al. | .................. | 340/425.5 |
| 2006/0155425 A1 * | 7/2006 | Howlett et al. | .................... | 701/1 |
| 2007/0028220 A1 * | 2/2007 | Miller et al. | ................... | 717/124 |
| 2008/0021604 A1 * | 1/2008 | Bouvier et al. | ................. | 701/30 |
| 2008/0140263 A1 * | 6/2008 | Wang et al. | .................... | 700/291 |

OTHER PUBLICATIONS

Dousis D A et al: "V-22 Tiltrotor Aircraft Vibration Monitoring From Design to Field Operations"; Aerospace Conference Proceedings, 2002. IEEE Mar. 9-16, 2002, Piscataway, NJ, USA, IEEE, vol. 6, Mar. 9, 2002, pp. 3051-3064, XP010604874.
U.S. Appl. No. 09/673,651, filed Feb. 25, 2000 (Not Yet Published).
U.S. Appl. No. 11/523,706, filed Sep. 20, 2006 (Not Yet Published).
U.S. Appl. No. 11/938,099, filed Nov. 9, 2007 (Not Yet Published).
U.S. Appl. No. 11/952,554, filed Dec. 7, 2007 (Not Yet Published).
U.S. Appl. No. 11/952,478, filed Dec. 7, 2007 (Not Yet Published).

* cited by examiner

*Primary Examiner* — Thomas Black
*Assistant Examiner* — Marthe Marc-Coleman
(74) *Attorney, Agent, or Firm* — Lowe Hauptman Ham & Berner, LLP

(57) ABSTRACT

A method of preventive maintenance for an aircraft, the aircraft having components, including items of equipment of the aircraft and/or electronic modules and/or physical links. The lifetime information for the components is known. The aircraft also includes means for monitoring the components, a centralized maintenance system, and means for estimating the life time of the components. The aircraft carries out a set of functions, each being ensured by a chain of components. The method comprises several steps including, a first step of locating the degradations of the items of equipment, a second step making it possible to allocate the located degradations to the various functions of the aircraft, a third step of estimating the lifetime of the functions identified in the second step, and a fourth step of formulating the maintenance message constructed on the basis of the previous steps.

8 Claims, 2 Drawing Sheets

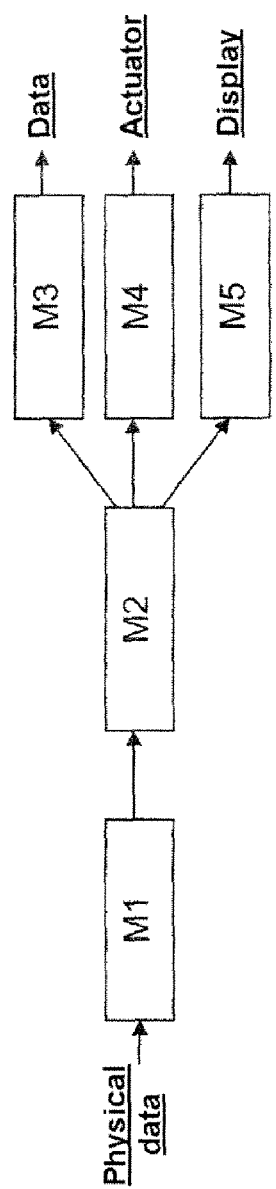

FORMULATION OF A PREVENTIVE MAINTENANCE MESSAGE RELATING TO THE FUNCTIONAL DEGRADATIONS OF AN AIRCRAFT

RELATED APPLICATIONS

The present application is based on, and claims priority from, French Application Number 06 10732, filed Dec. 8, 2006.

FIELD OF THE INVENTION

The present invention relates to the maintenance of a set of equipment, such as the set of avionics equipment of an aircraft which fulfils the various functions necessary for accomplishing a flight.

The methods and the device relate to the implementation of preventive maintenance on the basis of proven degradations of the aircraft's equipment. This preventive maintenance makes it possible to schedule ground interventions with the best effectiveness and at the least cost.

BACKGROUND

An aircraft comprises a large amount of equipment, of diverse nature, mechanical, hydraulic, electrical or electronic, whose proper operation is essential in the course of a flight.

To improve the degree of confidence accorded to this equipment, monitoring of its proper operation is undertaken, as often as possible, for each item. Monitoring generally comprises checking the fundamental parameters and automatic or semi-automatic tests of proper operation. Generally, a fault diagnosis is carried out and may lead to the emitting of fault messages.

A monitoring and alarm function makes it possible to detect a malfunction having an impact on the safety of the aircraft. A function of this type, also called "Flight Warning" in the art, is present on certain aircraft. A subfunction of the "Flight Warning", generally, named "Flight Deck Effect" in the art, makes it possible to present these alarms to the crew, these alarms referring to cockpit effects that may be interpreted as anomalies by the pilot.

Additionally, a maintenance function is associated with the monitoring function in order to diagnose faults and store them.

It is known by the name of BITE function, derived from the abbreviation of the expression "Built In Test Equipment".

The BITE function of an item of equipment is taken on by electronics which may be specific or shared with other functions of the item of equipment considered. This electronics performs the software processing required by the BITE function.

It comprises a more or less significant hardware part secured to the item of equipment, with, at the minimum, in this hardware part, a nonvolatile memory. Certain data are stored in the volatile memory, including the breaching of standards by the monitored parameters, the results of the tests, the fault diagnostic when it exists as well as the fault messages emitted. The fault messages of the BITE functions of the monitored equipment of an aircraft are addressed, by an airplane data transmission link, to a centralizer item of equipment placed aboard the aircraft so as to bundle together the various fault messages emitted.

Aboard recent aircraft, fault messages originating from the BITE functions of the various items of equipment are consultable from the flight deck. They are furthermore preprocessed, with a view to easing the task of crews and maintenance personnel, by a specialized central computer known by various terms such as CMC from the expression "Central Maintenance Computer" or else CFDIU from the expression "Centralized Fault Display Interface Unit".

This central maintenance computer is accessible by the crew through an interface with keyboard and screen which may be that known by the abbreviation MCDU derived from the expression "Multipurpose Control Display Unit" but which may also be a portable computer of the PC kind attached by a disconnectable data link which does or does not utilize the airplane bus.

Its main function is to effect, in real time or at the end of a flight, a diagnostic of the general situation of the aircraft. This diagnostic is carried out on the basis of a summary of the fault messages received from the various items of equipment of the aircraft.

II also fulfils other functions such as:
  correlation of the fault messages received with the alarms received at the flight deck level;
  running of particular tests on the items of equipment, conducted on request, by an operator intervening from the keyboard-screen interface giving access to the central maintenance computer;
  drafting of a "post-flight" report, known by various terms such as PFR or LLR for "Post Flight Report" or "Last Leg Report". This report is, generally, carried out for the maintenance teams on the ground.

The latter function which consists in providing a "post-flight" report makes it possible to ease the work of the ground maintenance crew. It comprises a log of the fault messages emitted by the various items of equipment of the aircraft and alarms presented to the crew as well as the summary of the fault messages made as a last resort and more generally, all the information on the operating states of the equipment. The information featuring in this report results from automatic exploitation of the equipment fault messages or remarks by the crew.

The faults are generally correlated with the equipment failure probability. This failure probability is estimated on the basis of a reliability model and is stored in a static manner.

This correlation makes it possible to plan anticipated or preventive maintenance actions on the corresponding items of equipment.

The logical chain for deciding the maintenance actions results from the noting of a proven fault and then its location and finally a formulated diagnostic.

Additionally, more and more data are being monitored around avionics equipment, such as vibrations, electromagnetic and thermal signatures and other data which make it possible to reconstitute the immediate environment of the computer. These data do not systematically generate proven faults.

Certain monitoring systems analyse the error rate or the number of lost frames which make it possible to identify not a fault but a possible degradation of the wiring. It is considered that this monitoring and the analysis of the degradations of an item of equipment may lead to a prognosis being carried out on the airplane's data network.

A prognosis carried out on engines exists today. Prognoses are evaluated on certain items of equipment, notably those named ACMS, the acronym standing for Aircraft Condition Monitoring System. The engine parameters, such as the temperatures or vibrations, for example, are recovered and monitored. Certain breaches of thresholds (or overshoots), for example, make it possible to trigger alarms advocating intervention actions.

On the other hand, the monitoring of these fault generating degradations is not correlated with the functions of the system. No functional analysis is carried out on the basis of the degradations detected. Moreover, the degradation information is processed without considering the reliability model of the functions, and this could make it possible to provide a preventive maintenance report.

Moreover, the analysis of the degradations is not generalized to all the equipment and is not analysed jointly with the functional architecture of an aircraft.

SUMMARY OF THE INVENTION

An aim of the invention is notably to alleviate the aforesaid drawbacks. For this purpose, the object of the invention is, in regard to the noted and analysed degradations of an aircraft, to centralize them by way of a function, named "Centralized Prognostic System"

On the basis of a known functional architecture of the aircraft and of the relation which links a function of the system to the equipment, an estimate of the lifetime of the function is calculated as a function of the lifetime of the components of the aircraft and of the degradations of the components, the said components comprising the various items of equipment and the physical linkups linking them.

Advantageously, the method of preventive maintenance for aircraft, the said aircraft comprising:
   components, the said components comprising items of equipment of the aircraft and/or electronic modules and/or physical links, the lifetime information for the components being known;
   means for monitoring the components;
   a centralized maintenance system (CMC);
   a digital database;
   calculation means for computing a function for estimating the life time of the components;
   an alarms manager;
   and display means;
   and carrying out a set of functions, each of the functions of the aircraft being ensured by a chain of components.

The method according to the invention comprises:
1. A first step of locating, by the monitoring means, the degradations of at least one item of equipment;
2. A second step making it possible to allocate the located degradations to the various functions of the aircraft on the basis of the database comprising the list of components and the functional architecture of the aircraft;
3. A third step of estimating the lifetime of the functions identified in the second step on the basis of the life time estimation function;
4. A fourth step of formulating the preventive maintenance message, the latter being constructed on the basis of the previous steps and of an alarms manager, the said message comprising degradation information linked with the various functions of the aircraft as well as an estimate of the lifetime of at least one function.

Advantageously, the degradations relate to the environmental degradations pertaining to temperature, vibrations or hygrometry, as well as the degradations of signals transmitted or received by the components.

Advantageously, the degradations are located by threshold overshoots, the said thresholds being defined, according to the nature of each of the degradations, by a predefined scale of numerical values.

Advantageously, a fifth step of collecting and archiving the preventive maintenance messages is carried out by the centralized maintenance system.

Advantageously, a degradation information cue, generated by the centralized maintenance system, is transmitted to the display means, the said degradation information cue comprising the functional degradation information and estimated lifetime information for at least one function.

Advantageously, the estimated lifetime of a function is the minimum lifetime of a set of components, each component being indispensable to the realization of the function.

Advantageously, an alarm message is generated by the alarm manager for the pilot indicating a probability of loss of at least one function, said message being used to identify the status of the aircraft before take off.

Advantageously, the status of the aircraft comprises, notably, information relating to the number of components fulfilling a function, the minimum number of components required to ensure the function.

Advantageously, the maintenance device is intended for a set of electronic or mechanical items of equipment comprising a centralized maintenance system, the said system making it possible to correlate the maintenance message formulated by the method described above with fault reports.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 2: Exemplary case of a sub-system of the airplane;

FIG. 3: Allocation of the functions to the components of the sub-system.

PREFERRED EMBODIMENTS OF THE INVENTION

Figure 1:
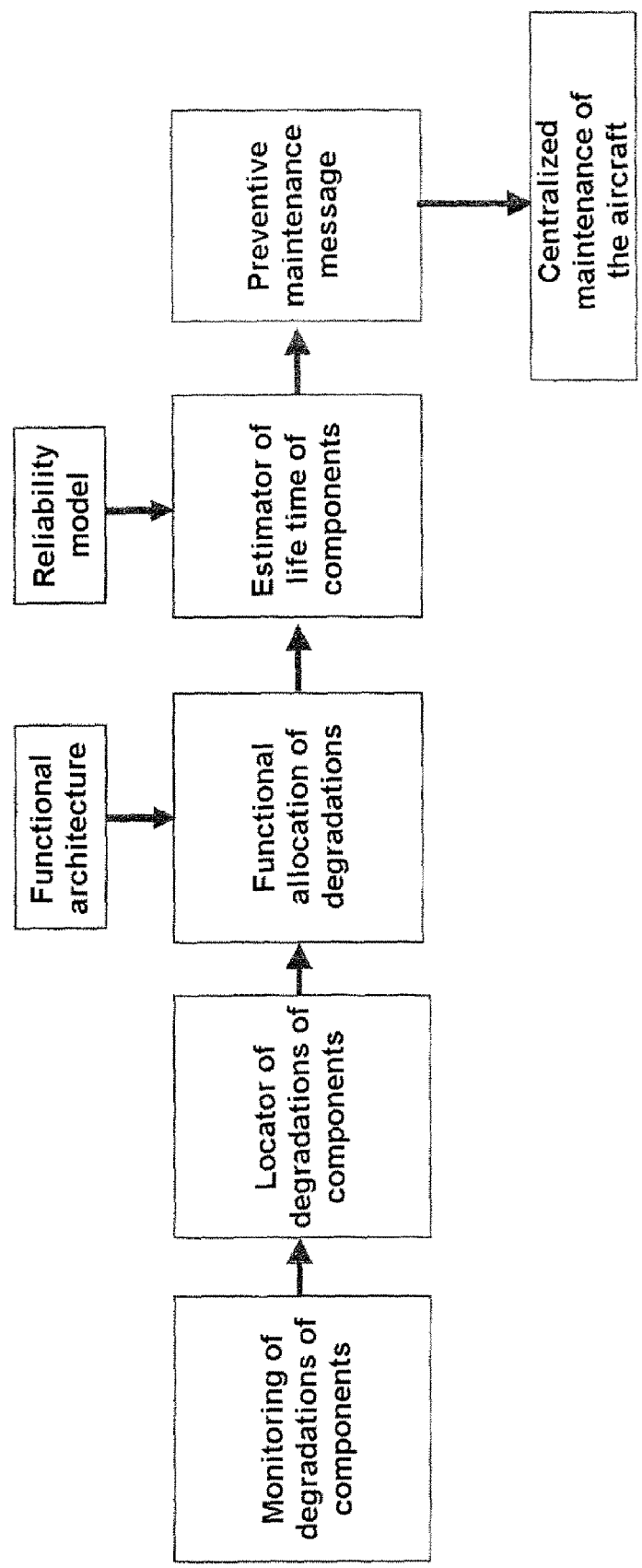
FIG. 1: The various steps of the method according to the invention.

The method according to the invention comprises several steps making it possible to construct, on the basis of the degradations of the components of the aircraft, a preventive maintenance message relating to the possible functional losses of the aircraft.

A set of items of equipment carrying out an aircraft level function is called a "system" or "sub-system" of the aircraft. For example, the aircraft can be considered as a system.

Additionally, any item of equipment of the aircraft or a part of an item of equipment of the aircraft, such as a module or an electronic card or else a physical link connecting two other components, is called a "component".

The physical links can be of various kinds, such as physical links, electrical links, optical links, hydraulic or pneumatic links.

Finally, it is considered that the aircraft comprises a set of functions and sub-functions, the latter being ensured by a chain of components. There exist several types of functions.

High-level functions can be, for example, the "aircraft guidance" function or the "piloting" function. Low-level functions can be, for example, the function "generate meteorological images" or the function "transfer altimetry data from the antenna to the display means".

There exist functions of a vital nature for the aircraft and others that are less critical for carrying out the main missions of an aircraft.

The "functional architecture" is defined subsequently as the set of relations linking the various functions of the aircraft.

FIG. 1 represents the chaining of the various steps of the method. On the basis of monitoring the degradations of the aircraft components, a first step is carried out so as to locate degradations in the aircraft. Once the various degradations have been located, a second step of functional allocation of the degradations to the functions is carried out. This step is performed on the basis of a functional architecture of the aircraft. In a third step, the reliability model of the components is extended to the functions of the aircraft to estimate the lifetime of certain functions, notably those to which the degradations relate. A fourth step makes it possible to formulate a preventive maintenance message so as to provide the centralized maintenance system with various preventive maintenance alarms.

The first step of locating the degradations, on the basis of monitoring means, makes it possible to identify the degradations of an item of equipment and to collect them. A function, called "Centralized Prognostic System", makes it possible to centralize the degradation information.

There exist several types of degradations measurable by known analysis means.

A first type of degradation is detected by environmental constraint measurement mechanisms. In this case the degradations are, notably, tagged by threshold overshoots for example. This may concern, for example, degradation information pertaining to the temperature, to the vibrations or else to the hygrometry of an item of equipment.

A second type of degradation relates to the measurements of the quality and/or quantity of digital or analogue signals. The number of frames lost in a link, the bit error rates of a data transfer or else the ratios of the level of a signal to the noise of an emit or a receive are various examples of degradations of this type.

The results are transmitted to the "Centralized Prognostic System" function and analysed so as to formulate, optionally, a report relating to the degradations, their frequency, their amplitude and their inter-consistency. Moreover, an analysis of the degradation of a component and of the properties of the component itself is performed.

Notably, an analysis consists in associating the lifetime of the component with each component of the system.

The Centralized Prognostic System function collects in a database for example the list of components, their lifetime and the degradations noted over a determined period.

A second step consists, on the basis of the known functional architecture of the system, the aircraft for example, in correlating the components with the various functions.

On the basis of the knowledge of the airplane configuration, the relation between the functions or sub-functions of the system and the items of equipment and/or the physical linkups of which it consists are available.

The airplane configuration is, generally, available in a centralized function for managing the airplane configuration or directly in the centralized maintenance function.

This information is, generally, contained in a digital database.

Generally, an airplane sub-system can be considered to be a set of means each being a component, that is to say an item of equipment or a sub-item of equipment for example.

FIG. 2 represents the various components of this sub-system by independent blocks. Each of the components is an item of equipment. The arrows represent in this example the direction of data captures and of their processing. The following means are considered in this example:

means for capturing physical data, denoted M1;
means for processing and analysing these data, denoted M2;
means for transmitting these data, denoted M3;
control means, denoted M4, comprising an actuator.
viewing means, denoted M5, and finally;

A certain number of functions and sub-functions are ensured by this sub-system. Each of these functions is not ensured by a single item of equipment.

Three functions of this sub-system are considered, the three functions supported by the aforesaid sub-system are denoted F1, F2 and F3. F3 can be a generation of icons represented on the screen on the basis of the captured data, F2 a guidance setpoint for the sensors, and finally F1 a generation of frames.

FIG. 3 represents an array corresponding to the relations between the functions and the aforesaid means. Each of these functions is carried out through the assistance of several components, like the electronic equipment customarily integrated in avionics.

For example, row number 1 of FIG. 3 specifies the relations between the function F1 which is carried out on the basis of the means M1, M2 and M3. A cross is represented in the array when a relation exists.

A third step consists in combining the allocation of the functions to each component with the estimated lifetimes of each of these components.

The estimated lifetime of a component is called, according to the terminology of the art, "time to live", it is denoted TTL.

There exist various ways to calculate the lifetimes of each of the functions. An exemplary calculation consists in determining the minimum of the lifetime of the components, each of the said components contributing to carrying out the function. This example does not restrict the scope of the method according to the invention.

The lifetime of each function is, therefore, determined by the most limiting lifetime of the components which contribute to carrying out the function.

The respective lifetimes of the means M1, M2, M3, M4, M5 are denoted $TTL_{M1}$, $TTL_{M2}$, $TTL_{M3}$, $TTL_{M4}$, $TTL_{M5}$. In this example, the following convention is written, following a prior calculation of each of the estimated lifetimes of each of the items of equipment:

$$TTL_{M1} > TTL_{M2} > TTL_{M3} > TTL_{M4} > TTL_{M5}$$

The lifetimes of the functions F1, F2, F3 are denoted $TTL_{F1}$, $TTL_{F2}$, $TTL_{F3}$ respectively. The following relations are therefore obtained:

$$TTL_{F1} = \text{Minimum}(TTL_{M1}, TTL_{M2}, TTL_{M3}) = TTL_{M3}$$

$$TTL_{F2} = \text{Minimum}(TTL_{M1}, TTL_{M2}, TTL_{M4}) = TTL_{M4}$$

$$TTL_{F3} = \text{Minimum}(TTL_{M2}, TTL_{M5}) = TTL_{M5}$$

Additionally, any system or sub-system of an aircraft can be processed like the example of the sub-system above. The method according to the invention relates to all the systems included in an aircraft, including the aircraft system itself.

The above case of realization does not restrict the scope of the method according to the invention, but constitutes a case of realization applied to a sub-system of the aircraft.

A last step of constructing the maintenance message makes it possible to inform the maintenance operator and possibly the pilot, by means of alarms, generated by way of an alarm manager, of the possible loss of certain functions due to certain degradations. The possible loss is assessed by analysing the calculated lifetime of each function.

In order to carry out the latter step, the maintenance message uses the current means which generate the proven faults in order to make it possible to construct functional loss alarms identically.

The logic for emitting these alarms is, generally, centralized in the alarms management centre, also called "Flight Warning" in the art. Some of them are emitted to the viewing means, so as to provide the pilot with a preventive functional loss information cue.

For example a maintenance message can be supplemented with possible information regarding functional degradations that are imminent or have a longer timescale so as to enable the pilot to decide whether or not the aircraft should take off. An estimated lifetime of a functional degradation may be provided to the pilot, as well as an assessment of the significance of the seriousness of the degradation.

The maintenance message thus formulated can be for example: "loss of the function F2 in 4 months", thus taking into account the noted degradation of the component (components) as well as the estimated lifetime of this (these) component (components).

In the latter case, the message is an input datum for what is called the "Minimum Equipment List", denoted MEL. This list identifies the status of the aircraft so as to permit or not permit the flight. Notably this list provides a list of the restrictions and limitations of uses according to the messages or alarms which are dispatched to the MEL. The MEL also gives the number of elements fulfilling a function, the minimum number of elements required, possibly any remarks or else exceptions.

Thus, the method according to the invention allows the maintenance operator to clearly identify a degradation and the impact of this degradation on the functions of the aircraft. It is, hence, possible to best schedule the next maintenance operations and to improve the times during which the aircraft is grounded;

the pilot to ascertain in a preventive manner a functional state of the aircraft when required and possibly to monitor the MEL which can comprise prognoses of functional degradations of the aircraft.

It will be readily seen by one of ordinary skill in the art that the present invention fulfils all of the objects set forth above. After reading the foregoing specification, one of ordinary skill in the art will be able to affect various changes, substitutions of equivalents and various aspects of the inventions as broadly disclosed herein. It is therefore intended that the protection granted hereon be limited only by the definition contained in the appended claims and equivalent thereof.

The invention claimed is:

1. A method of preventive maintenance for an aircraft, the aircraft including:

a plurality of components, the components including items of equipment of the aircraft and/or electronic modules and/or physical links, wherein lifetime information for the components is known, the aircraft further including:

a monitoring unit for monitoring the components, a centralized maintenance system, a digital database, an aircraft functional architecture contained in the digital database, said aircraft functional architecture specifying for each function of the functional architecture links between the respective function and the components which are needed to carry out the respective function;

calculation unit for computing a function for estimating lifetime of the components, an alarm manager, and a display unit, the aircraft carrying out a set of the functions, each of the set of the functions being carried out by a chain of the components, the method comprising the steps of:

locating, by the monitoring unit, degradations of at least one item of equipment;

allocating the located degradations to at least one of the set of the functions of the aircraft on the basis of the links in the aircraft functional architecture;

estimating a lifetime of the at least one of the set of the functions in the allocating step on the basis of the lifetime estimation function; and formulating a preventive maintenance message, the preventive maintenance message being constructed on the basis of the previous steps and of an alarms manager, the message comprising functional degradation information linked with the at least one of the set of the functions of the aircraft and estimated lifetime information of the at least one of the set of the functions.

2. The method according to claim 1, wherein the degradations relate to environmental degradations pertaining to temperature, vibrations or hygrometry, and degradations of signals transmitted or received by a component.

3. The method according to claim 2, wherein a degradation information cue generated by the centralized maintenance system, is transmitted to the display unit, the degradation information cue comprising the functional degradation information and estimated lifetime information for at least one of the set of the functions.

4. A maintenance device intended for a set of electronic or mechanical items of equipment to correlate the preventive maintenance message formulated by the method of claim 2 with fault reports using the centralized maintenance system.

5. The device according to claim 4, wherein an alarm message is generated by an alarm manager destined for a pilot when a function has been identified possessing a failure probability exceeding a predefined threshold.

6. The method according to claim 1, wherein the degradations are located by threshold overshoots, thresholds of the threshold overshoots being defined, according to a nature of each of the degradations, by a predefined scale of numerical values.

7. The method according to claim 1, further comprising collecting and archiving the preventive maintenance messages, is carried out by the centralized maintenance system.

8. The method according to claim 1, wherein the estimated lifetime of the at least one of the set of the functions is a minimum lifetime of a set of components, each component being indispensable to a realization of the at least one of the set of the functions.

* * * * *